GOURLEY & KREBS.
Carriage-Brake.
No. 22,498.  Patented Jan. 4, 1859.
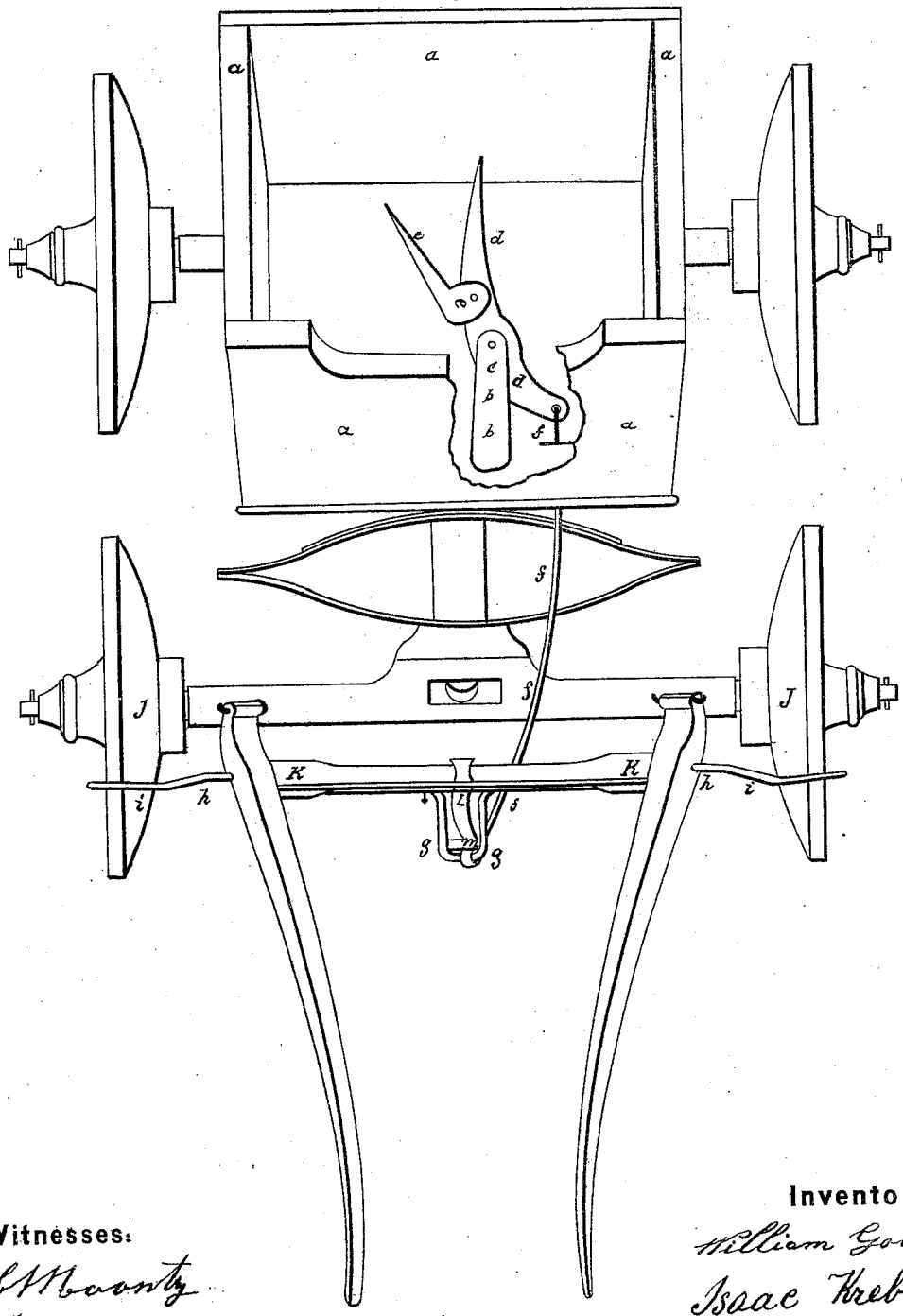
Witnesses:
Inventor:
William Gourley
Isaac Krebs
Winchester Va

UNITED STATES PATENT OFFICE.

WM. GOURLEY AND ISAAC KREBS, OF WINCHESTER, VIRGINIA.

MEANS OF OPERATING CARRIAGE-BRAKES.

Specification of Letters Patent No. 22,498, dated January 4, 1859.

*To all whom it may concern:*

Be it known that we, WILLIAM GOURLEY and ISAAC KREBS, both of Winchester, in the county of Frederick and State of Virginia, have invented and made certain new and useful Improvements in the Method or Mode of Operating Brakes for Vehicles; and we do hereby declare that the following is a full, clear, and exact description thereof, reference being had to the accompanying drawings, making a part of this specification, in which—

Figure 1 is a top and front view of a vehicle with the brake devices attached.

The nature of our improvements consists in constructing and applying brakes to vehicles in such a manner, as that the power applied to the brake can be so regulated as to accommodate itself to the amount of weight on the vehicle, and compensate for the varying depression of the springs thereof, while at the same time the brake or rubber rod in its action supports in a measure the weight of the shafts, thus easing the strain or draft of the animal hitched to the vehicle.

The better to enable others to be skilled in the construction and application of our improvements, the following is a description thereof.

At $a, a, a, a$, is represented the body of a light wagon or carryall, with a fragment taken from the front, so as to show the connection of the brake devices.

At $b, b$, is an upright or standard of suitable size, inserted in the bottom of the vehicle. The upper end of this upright is formed with a slot or crotch $c$, in which works on a fulcrum a lever $d, d$, and to which is connected to the longer or handle part thereof, a secondary handle or joint lever $e, e$, and to the shorter or butt end of the main lever $d, d$, is connected a rod $f, f, f, f$, passing down through the bottom of the vehicle and connecting by a hooked or looped end with a crank shaped bar or rubber rod $g, g, h, h, i, i$, the ends of which pass through the butt ends of the shafts of the vehicle, the extremities of the rubber rod being bent as at $h, i$, so as to come in contact with the periphery of the front wheel $j, j$.

To the cross rail or shaft bar $k, k$, is attached a flat flexible piece of metal or spring, L, formed with a T like end $m$, which rests against the crank formation $g, g$, on the inner surface or back thereof.

The operation of our improvements is as follows: When desired to check or retard the motion of the vehicle, the person seated within it applies the hand or foot to the secondary handle or joint lever $e, e$, first, and should the movement of said lever not be sufficient or should it come too soon in contact with the bottom of the vehicle, in the event of there being too much weight on the springs, causing them to depress too low, then the power is applied to the main or larger lever $d, d$, which thus enables an increased amount of pressure to be applied, as well more particularly to make up in distance of play of the lever, what might be taken from the joint lever $e, e$, in the depression or sinking down of the springs. The lever $d, d$, being attached to the connecting rod $f, f, f, f$, is united also to the crank part of the rubber or brake bar, and as the compound lever $d, d, e, e$, is acted on, the rod $f, f, f, f$, draws back the brake bar $g, h, i$, which bears or presses against the periphery of the front wheels of the vehicle, thus checking the movement thereof most effectually so long as pressure or power is applied and maintained on the lever $d, d, e, e$. When the pressure on the wheels is to be dispensed with the brake bar $g, h, i$, is thrown off the wheels by the reacting agency of the spring device L, $m$.

Having described in full the nature, construction, and operation of our improvements, what we claim as new and desire to have secured by Letters Patent of the United States, is—

The construction and application of the compound or double lever $d, d, e, e$, as described, and the crank shaped rubber rod or brake bar $g, h, i$, and T shaped spring L, when combined and operated substantially as herein set forth and described.

WILLIAM GOURLEY. [L. S.]
ISAAC KREBS. [L. S.]

Witnesses:
STEPHEN JENKINS,
D. S. RUSSELL.